(12) United States Patent
Yamauchi et al.

(10) Patent No.: US 7,181,443 B2
(45) Date of Patent: Feb. 20, 2007

(54) SYSTEM AND METHOD FOR SUPPORTING A TARIFF CODE SELECTION

(75) Inventors: Akira Yamauchi, Tokyo (JP); Atsushi Nishimura, Tokyo (JP); Junko Sweet, Long Beach, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 332 days.

(21) Appl. No.: 10/424,979

(22) Filed: Apr. 29, 2003

(65) Prior Publication Data

US 2003/0229615 A1  Dec. 11, 2003

(30) Foreign Application Priority Data

Apr. 30, 2002  (JP) ............... 2002-128049

(51) Int. Cl.
  G06F 17/30  (2006.01)
  G06F 17/00  (2006.01)
(52) U.S. Cl. ................. 707/3; 707/104.1
(58) Field of Classification Search ......... 707/3, 707/4, 104.1; 705/1, 20, 22, 28
See application file for complete search history.

(56) References Cited

U.S. PATENT DOCUMENTS

| | | | |
|---|---|---|---|
| 6,324,522 B2 * | 11/2001 | Peterson et al. | 705/28 |
| 6,408,270 B1 * | 6/2002 | Garber | 704/251 |
| 6,466,948 B1 * | 10/2002 | Levitsky et al. | 707/104.1 |
| 6,845,364 B1 * | 1/2005 | Pool et al. | 705/26 |
| 2002/0082956 A1 * | 6/2002 | Peterson et al. | 705/28 |
| 2003/0115129 A1 * | 6/2003 | Feaver et al. | 705/37 |
| 2003/0163447 A1 * | 8/2003 | Sandman | 707/1 |
| 2005/0075955 A1 * | 4/2005 | Milovina-Meyer et al. | 705/30 |
| 2005/0177426 A1 * | 8/2005 | Holmes et al. | 705/14 |

FOREIGN PATENT DOCUMENTS

| | | |
|---|---|---|
| JP | 2001-202568 | 7/2001 |
| WO | WO 01/93125 A2 | 12/2001 |

* cited by examiner

*Primary Examiner*—Sam Rimell
*Assistant Examiner*—Alicia Lewis
(74) *Attorney, Agent, or Firm*—Arent Fox PLLC

(57) ABSTRACT

The present invention provides a system for supporting a tariff code selection. The system comprises a database for storing commodity codes for the commodities in association with tariff codes used in an importing country, said database being searched using the commodity code as a key. Tariff code selection tables are included in the database for storing tariff items hierarchically classified in accordance with the attributes thereof. The system is programmed to search a record of a commodity code similar to the commodity code of the search key when said search key resulted in no hits. The tariff code selection table including the record of the similar commodity code is displayed on a display device.

6 Claims, 6 Drawing Sheets

SEARCH FOR SIMILAR PART NUMBER

PART NUMBER [        ]                                          SEARCH

| PART NUMBER | ITEM | TARIFF ITEM TABLE NUMBER | TARIFF ITEM |
|---|---|---|---|
|  |  |  |  |
|  |  |  |  |
|  |  |  |  |
|  |  |  |  |
|  |  |  |  |

SELECT   EXIT

FIG. 5

| | | | | | 90 |
|---|---|---|---|---|---|
| TARIFF CODE SELECTION | PART NUMBER [ ] | | | | |
| | ITEM [ ] | | | | |
| TABLE No. [ 05498 ] | TABLE NAME [ TUBE, HOSE ] | | | 92 | 94 |

| LEVEL 2 | LEVEL 3 | LEVEL 4 | LEVEL 5 | |
|---|---|---|---|---|
| VULCANISED TUBE | WITHOUT JOINT | NOT REINFORCED | | SELECT |
| | | REINFORCED | TYPE OF REINFORCEMENT | SELECT |
| | WITH JOINT | BRAKE TUBE | | SELECT |
| | | OTHERS | NOT REINFORCED | SELECT |
| | | | REINFORCED | SELECT |
| PLASTIC TUBE | BRAKE TUBE WITH JOINT | | | SELECT |
| | OTHERS | POSITION | | SELECT |
| TUBE OF OTHER MATERIAL | | | | SELECT |

TARIFF ITEM [ ] ⟵ 95

TARIFF CODE [ ] ⟵ 96

EXIT

SYSTEM AND METHOD FOR SUPPORTING A TARIFF CODE SELECTION

TECHNICAL FIELD

The invention relates to a system and method for supporting a tariff code selection in a destination country.

BACKGROUND OF THE INVENTION

When exporting commodity to a foreign country, an importer needs to prepare documents including an invoice that has been sent from an exporter and to file an application for import-license with the customs of the importing country. Thus, the importer gets an import license and pay the customs duty.

When making an import declaration, the importer needs to classify the imported commodity according to the tariff rate table to determine the tariff code. The tariff rate table is subdivided systematically from major classification to minor classification. Every imported commodity needs to belong to one of the classifications. Assigning the imported commodity to a corresponding item of the tariff rate table is called tariff classification.

Although tariff codes are determined based on the international treaty (HS treaty), some tariff codes are different between the exporting country and the importing country. This difference is occurred because setting subdivision for the tariff codes in each country is permitted. For example, the tariff codes in Japan have nine digits whereas those in the United States have ten digits. This sometimes makes the tariff classification work difficult.

As an example, when exporting automobile parts from Japan to the United States, the exporter or customs clearance agent assigns tariff codes to the parts, prepares an invoice for the details of the parts and exports the parts after clearing the customs in Japan. When the parts arrive in the importing country, staff member of the exporter's firm or the customs clearance agent takes an import application with the customs of the importing country.

Because the tariff codes are subdivided, it is difficult for the person whose knowledge about the parts is poor to select a correct tariff code. For example, assume the part name is a pipe, the tariff code may be different depending on its length and whether it has a bush or not. In the example described above, the customs clearance agent may determine the tariff code based on mainly the name of the part. The agent may select a wrong code or assign different tariff codes to the same part. When the error of the tariff code is discovered at the customs of the importing country, the importer needs to take a correction procedure for correcting the tariff code, which may incur stay of the part at the customs, or hindering quick import into the importing country. Furthermore, when the amount of the customs duty to be paid is wrong due to the error of the tariff code, the importer would be charged with a penalty.

Therefore, there exists a need for a database system which enables quick retrieval of a proper tariff code.

SUMMARY OF THE INVENTION

The present invention provides a system for supporting a tariff code selection. The system comprises a database for storing commodity codes for the commodities in association with tariff codes used in an importing country, said database being searched using the commodity code as a key. Tariff code selection tables are included in the database for storing tariff items hierarchically classified in accordance with the attributes thereof. The system is programmed to search a record of a commodity code similar to the commodity code of the search key when said search key resulted in no hits The tariff code selection table including the record of the similar commodity code is displayed on a display device.

According to one aspect of the invention, the system is further programmed to store, responsive to selection of a tariff code from the tariff code selection table, the selected tariff code in association with the commodity code of the search key.

According to another aspect of the invention, the system searches the record of the commodity code by using a higher significance code consisting of a portion of the commodity code.

BRIEF DESCRIPTION OF THE DRAWINGS

FIG. 4 shows an example of a menu view used for searching similar part number according to one embodiment of the invention;

FIG. 5 shows an example of a tariff code selection view according to one embodiment of the invention.

DETAILED DESCRIPTION OF THE PREFERRED EMBODIMENTS

Figure 1:
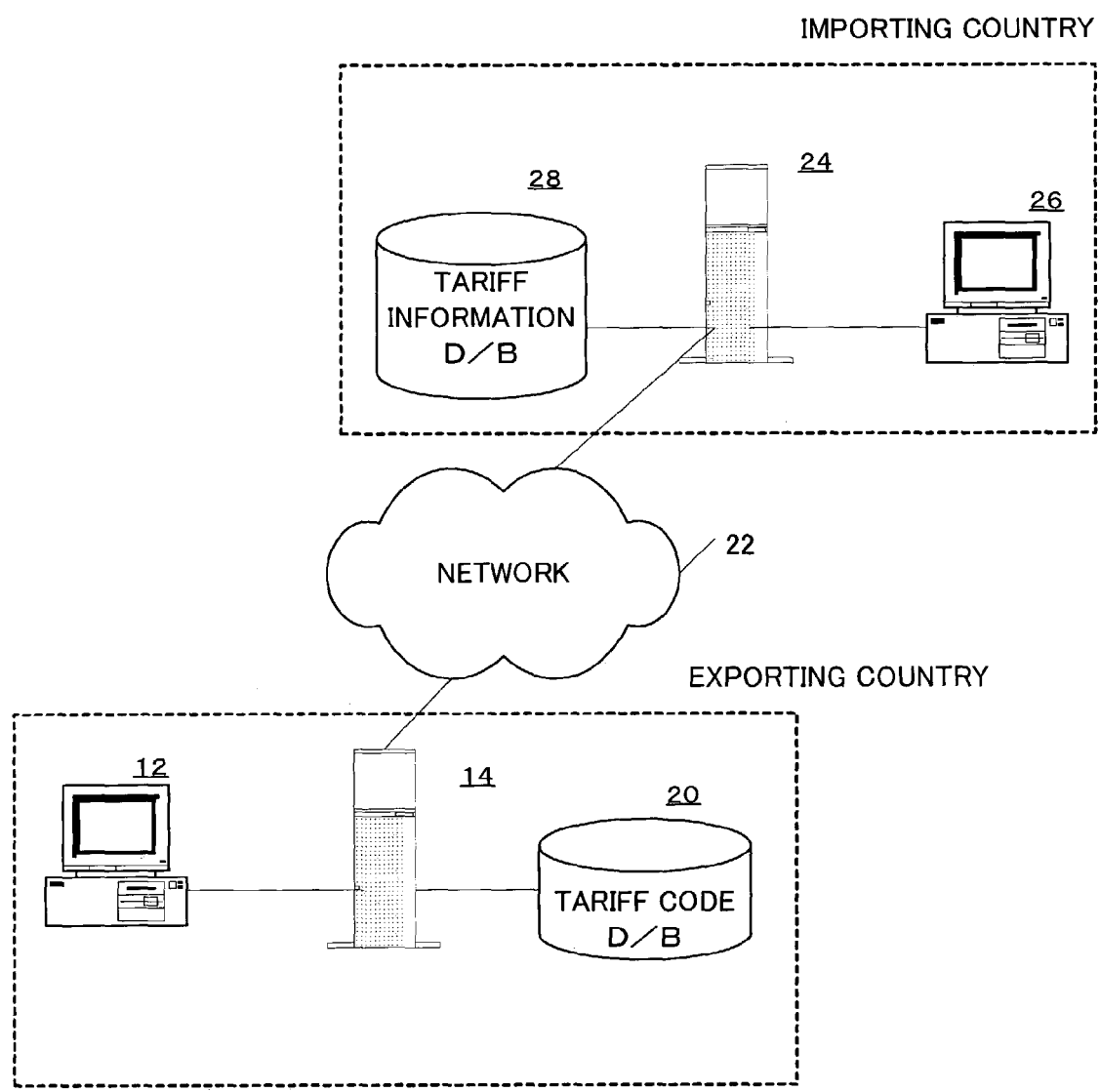
FIG. 1 is a block diagram showing the system according to one embodiment of the invention.

FIG. 1 is a block diagram showing a system configuration according to one embodiment of the invention. In this exemplary embodiment, the exporter is parts business division of an automobile company, which supplies various parts to related companies in foreign countries. In this exemplary embodiment, a country of export destination is the United States. A tariff code selection support system comprises a computer terminal 12, a server 14 and a tariff code database 20. The tariff code database 20 stores some tariff code correspondence tables including part numbers of parts for export and corresponding tariff codes used in the destination country (for example, the United States), and tariff item tables arranged in a hierarchical format.

The computer terminal 12 may be a general-purpose computer, which is connected to the server 14 via intra-company local area network (LAN) or virtual private network (VPN). When a staff member in charge of exporting prepares an invoice for parts to be exported, the staff member uses the terminal 12 to access the server 14. Then the staff member searches the database 20 with part numbers of the parts as a key to obtain the tariff code for the parts used in the destination country. The staff member enters the obtained tariff code to the invoice.

On the importing side, there are a server 24 and a computer terminal 26 connected to the server via LAN. The server 14 on the exporting side and the server 24 on the importing side are connected via a secure network 22 where a tight security is established (for example, VPN). A database 28 connected to the server 24 on the importing side includes data related to the tariff codes of the United States (the destination country in this embodiment). The server 14 on the exporting side may be connected to the server on the importing side to access data related to the tariff codes for the destination country. For example, when the tariff codes is added or changed, the server 14 on the exporting side may download the data for the revised version from the server 24 on the importing side and then update its tariff code database 20.

Each of the terminals 12, 26 comprises a display for use in graphical user interface (GUI) and an input device such as a mouse or a keyboard. The terminal 12 also comprises a browser allowing a user to access the tariff code selection support system provided by the server 14 by entering a given uniform resource locator (URL) or IP address. In each page, various links are embedded so that the user may move to various linked pages by clicking a button in the view. The user may also use the keyboard or the like to input appropriate information on a given form in the view. Although one terminal is connected to each of the servers in FIG. 1, any number of terminals may be connected to each of them.

Figure 2:
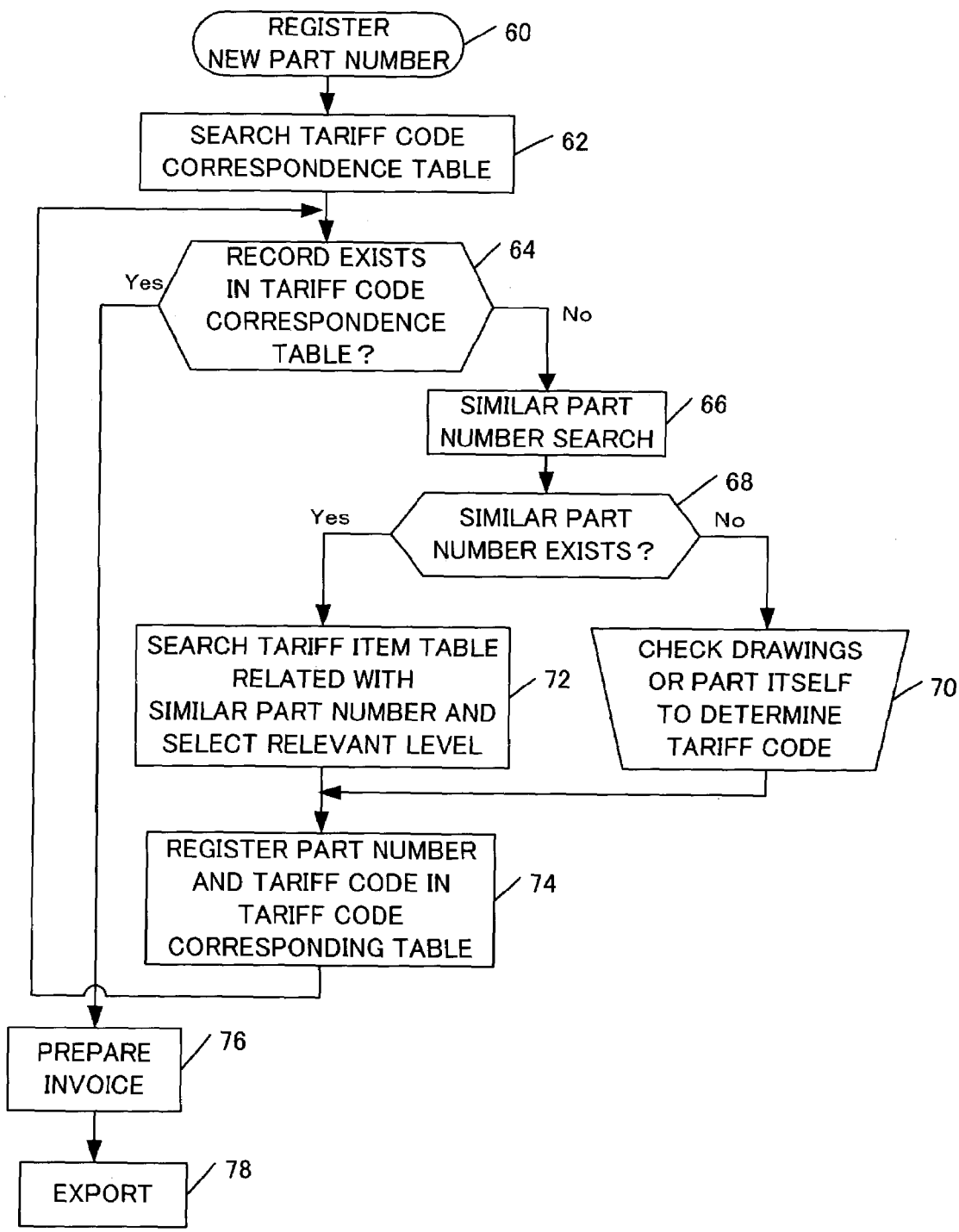
FIG. 2 shows a process of tariff code selection according to one embodiment of the invention.

Referring to FIG. 2, a process for determining a tariff code by using the tariff code selection support system according to one embodiment of the invention will be described. When exporting parts to the destination country, a staff member uses part numbers of the parts as a key to search the tariff code correspondence table stored in the tariff code database 20 (step 62). When the part numbers are used as the key for this search has been registered in the tariff code correspondence table (step 60), the tariff code used in the destination country may be immediately obtained through the search. Thus the staff member may prepare the invoice using the tariff code (step 76), and the part can be exported (step 78). Depending on the system design, the search may be carried out by using items other than the part number as a key, including a product type, a model and commodity code.

If the key used in the search (that is, a part number, a product type, a model or a commodity code) is not registered in the tariff code correspondence table (step 64), the process proceeds to a step of similar part number search (step 66). In this step, it is determined whether a record of a part number similar to the part number to be searched is stored in the tariff code correspondence table. For example, when a part number consists of four higher significance code digits and four lower significance code digits, the records of the part number are searched with the four higher significance code digits as a key. When at least one record of the similar part number exists, a tariff item table related to this similar part number is looked up. The tariff item table has an appropriate relationship with the tariff code correspondence table. Accordingly, when a part number is selected, the tariff item table related to the selected part number may be read out from a tariff item master table. Thus, by sequentially selecting the items according to the hierarchy of the retrieved tariff item tables, the user may obtain the tariff code that corresponds to the part number being searched (step 72). Such determined tariff code is stored in association with the part number being searched (step 74). In other words, the part number and the determined tariff code are associated each other and are stored in the tariff code correspondence table. Thus, when the same part number is searched next time, the relevant tariff code may be immediately obtained by searching the tariff code correspondence table.

When there is no record of similar part number in step 68, the staff member examines the drawing or the part itself to determine the tariff code for that part (step 70), associates such determined tariff code with the part number. The associated tariff code and part number are stored in the tariff code correspondence table (step 72).

Figure 3:
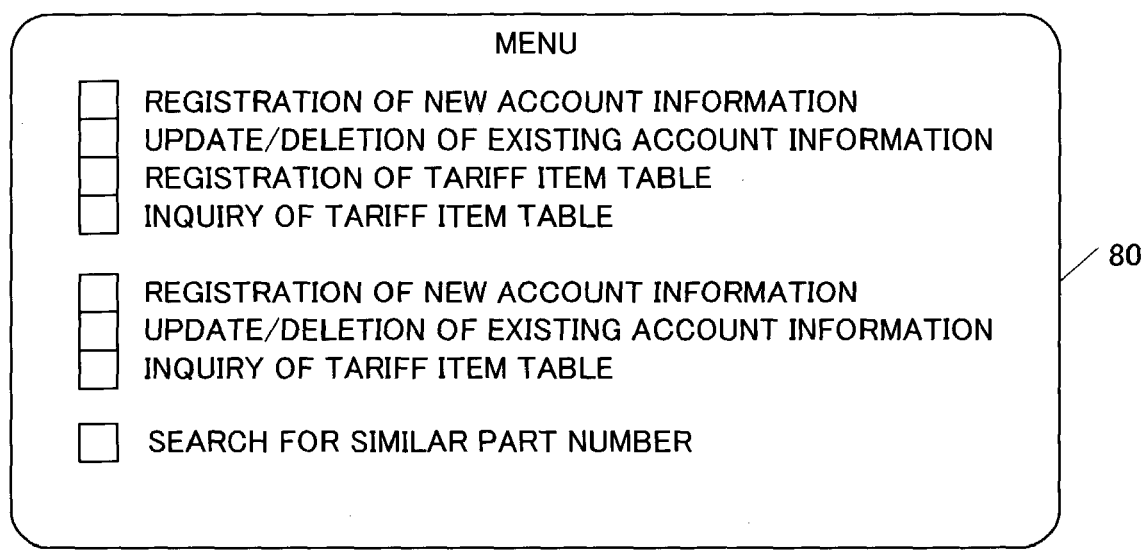
FIG. 3 shows an example of a menu view according to one embodiment of the invention.

Referring to FIG. 3 to FIG. 5, details of the similar part number search will be described. When a staff member accesses a site for supporting tariff code selection, a menu 80 shown in FIG. 3 is displayed. A "registration of new account information" routine in the menu 80 is designed for registering a part with the tariff code correspondence table, and a "update/deletion of existing account information" routine is designed for updating or deleting the registered account information. The tariff item table is a table in which the items to be processed for customs clearance are associated with corresponding tariff codes and are arranged in a hierarchically format. This tariff item table is later referred to as a level 1 hierarchy table of the major classification. An integrated table containing multiple tariff item tables is referred to as a tariff item master table. In this exemplary embodiment, this master table is pre-established based on the tariff code system of the destination country. A new tariff code may be registered in this tariff item master table by using the "registration of tariff item table" routine shown in the menu view 80. The tariff item tables may be looked up with the "inquiry of tariff item table" routine.

A similar part number search step 66 in FIG. 2 starts with selection of the "search for similar part number" in the menu 80 shown in FIG. 3. When the "search for similar part number" is selected, a view 106 shown in FIG. 4 is displayed. When a part number to be searched is entered in the part number field located at the top of this view and a "search" button is clicked, the part numbers are searched. The highest significance digits (namely, four most significant digits) are common to similar parts. A list of the part numbers, item names, tariff item table numbers and tariff items for the retrieved part numbers are displayed in a table located at the center of the view 106. When many part numbers are hit, all of those retrieved part numbers may be viewed by dragging the scroll button located on the right side of the table.

The staff member looks up the item names of the similar part numbers or their corresponding tariff items displayed in the view 106, and clicks/selects the number of the tariff item table which is most relevant to the searched part number. The staff member then clicks a selection button provided at the bottom right of the view. Assuming, in this exemplary embodiment, that "tube, hose" of tariff item table number 05498 is selected, the tariff item table having this number is read out from the tariff item master table and displayed in the view 80 shown in FIG. 5. A table 92 shown in the center of this view hierarchically indicates the tariff codes of the individual items which belong to the higher level (level 1) item "tube, hose".

The "tube, hose" is an item of level 1, which is the highest hierarchy level of the classification. Level 2 hierarchy includes three items of "vulcanized tube", "plastic tube" and "tube of other materials". The "vulcanized tube" of level 2 is divided into "without joint" and "with joint" as level 3 hierarchy. The "plastic tube" is divided into "brake tube with joint" and "others". The "without joint" of level 3 belonging to the lower level of "the vulcanized tube" of level 2 is further divided into "not reinforced" and "reinforced" as level 4. The "with joint" of level 3 is divided into "brake tube" and "others" of level 4. This "others" is further divided into "not reinforced" and "reinforced" as level 5 hierarchy.

As an example, when the part to be searched for the selection of a tariff code belongs to the "vulcanized tube" of level 2, has joints, is not a brake tube and is not reinforced, the staff member proceeds with the table hierarchy sequentially from level 2, level 3, level 4 and level 5 to finally select "not reinforced" of level 5. When the staff member clicks on a selection button 94 located in the right of "not reinforced", the name and the tariff code of the tariff item of this item are displayed in the bottom fields 95 and 96 in the view 90. At the same time, this tariff code is assigned to the searched part number, and the part number and the tariff code are stored in the part number/tariff code correspondence table. Thus, a proper tariff code is assigned to a part number even if the tariff code about that part number has not been known.

Figure 6:
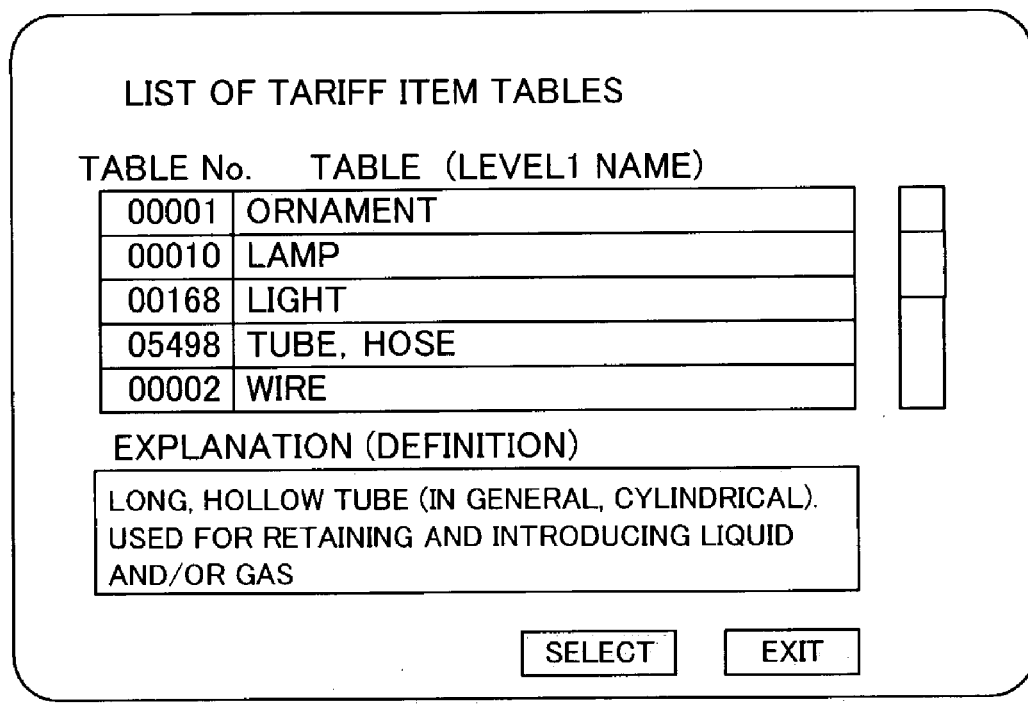
FIG. 6 shows an example of a view for listing a tariff item table according to one embodiment of the invention.

When the "tariff item table inquiry" is selected in the menu view 80 of FIG. 3, a list of tariff item tables is displayed as shown in a view 120 of FIG. 6. This view displays the number, name and description of each of the registered tariff item tables. Although determination of the tariff code in the above-described embodiment starts with the similar part number search before use of the hierarchically-structured tariff item tables, the process may alternatively start with the step of "inquiry of the tariff item tables" instead of the similar part number search. In this alternative case, the user may scroll the view of the list of the tariff item tables, clicks to select the appropriate table and then clicks the selection button. The tariff code selection view 90 shown in FIG. 5 is displayed. The process after having reached this view is same as above described.

Although the present invention has been described with respect to the specific embodiments, the invention is not limited to those embodiments. For example, when a view is displayed on the display, an item is clicked/selected and then a selection or decision button is clicked in order to proceed to the next step. Alternatively, it is possible to embed a link to the next step in the item to be selected to proceed to the next step simply by clicking the item.

What is claimed is:

1. A system for supporting tariff code selection, comprising a database for storing commodity codes for the commodities in association with tariff codes used in an importing country, said database being searched using the commodity code as a key, said system comprising:

tariff code selection tables included in the database for storing tariff items hierarchically classified in accordance with the attributes thereof;

the system being programmed to:

search said database for a tariff code using the commodity code as a key, and if a hit is made, outputting a tariff code corresponding to the hit commodity code;

when no records are found in the database that correspond to the commodity code, search the database using as a search key a commodity code similar to the commodity code of the search key display the tariff code selection table hit by the similar commodity code on a display device; and responsive to selection of a tariff code from the tariff code selection table, register in said table the selected tariff code in association with said commodity code that had no corresponding records.

2. The system as claimed in claim 1, wherein the system is further programmed to store, responsive to selection of a tariff code from the tariff code selection table, the selected tariff code in association with the commodity code of the search key.

3. The system as claimed in claim 1, wherein the system searches the record of the commodity code by using a higher significance code consisting of a portion of the commodity code.

4. A method for supporting tariff code selection comprising:

providing a database for storing commodity codes for the commodities in association with tariff codes used in an importing country;

providing tariff code selection tables included in the database for storing tariff items hierarchically classified according to the attributes thereof;

searching said database for a tariff code using a commodity code as a search key, and if a hit is made, outputting a tariff code corresponding to the hit commodity code;

searching said database using as a search key a commodity code similar to the commodity code of the search key when said search key resulted in no hits;

displaying the tariff code selection table hit by the similar commodity code on a display device; and responsive to selection of a tariff code from the tariff code selection table, registering in said table the selected tariff code in association with said commodity code that had no hits.

5. The method as claimed in claim 4, further comprising storing, responsive to selection of a tariff code from the tariff code selection table, the selected tariff code in association with the commodity code of the search key.

6. The method as claimed in claim 5, wherein said searching is performed by using a higher significance code consisting of a portion of the commodity code.

* * * * *